United States Patent [19]
Forejt et al.

[11] Patent Number: 6,116,881
[45] Date of Patent: Sep. 12, 2000

[54] DEVICE FOR LIFTING OF UPPER PART OF CURING PRESS STEAM CHAMBER

[75] Inventors: Jiří Forejt; Stanislav Rom, both of Plzeň, Czech Rep.

[73] Assignee: SKODA TS a.s., Czech Rep.

[21] Appl. No.: 09/124,684

[22] Filed: Jul. 30, 1998

[30] Foreign Application Priority Data

Aug. 8, 1997 [CZ] Czech Rep. .............................. 2519-97

[51] Int. Cl.⁷ .................................................. B29C 35/00
[52] U.S. Cl. ........................ 425/28.1; 425/34.1; 425/47; 425/450.1
[58] Field of Search ................... 425/28.1, 34.1, 425/34.3, 38, 47, 450.1

[56] References Cited

U.S. PATENT DOCUMENTS

| 2,343,881 | 3/1944 | Brundage | 425/34.1 |
|---|---|---|---|
| 3,932,079 | 1/1976 | Legostaev et al. | 425/34.1 |
| 4,618,320 | 10/1986 | Singh | 425/38 |
| 4,647,273 | 3/1987 | Singh et al. | 425/34.1 |
| 4,744,739 | 5/1988 | Singh | 425/34.1 |

FOREIGN PATENT DOCUMENTS 0718082  6/1996  European Pat. Off. .

Primary Examiner—James P. Mackey
Attorney, Agent, or Firm—Burns, Doane, Swecker & Mathis, LLP

[57] ABSTRACT

A device for lifting an upper part of a curing press steam chamber includes rollers which move along guideways. The lifting device allows an upper part of the steam chamber to be lifted off a lower part of the steam chamber and moved laterally to allow easy access to both the upper part of the steam chamber and the lower part of the steam chamber. A linear motor moves the rollers along the guideways to lift the upper part of the steam chamber off the lower part of the steam chamber. The linear motor may be a translating screw or a hydraulic cylinder motor. A longitudinal axis of the linear motor forms an angle with the guideways which is smaller than a right angle at all positions.

13 Claims, 2 Drawing Sheets

DEVICE FOR LIFTING OF UPPER PART OF CURING PRESS STEAM CHAMBER

BACKGROUND OF THE INVENTION

1. Field of the Invention

The invention relates to a device for lifting an upper part of a curing press steam chamber. More particularly, the invention relates to a device for lifting an upper part of a curing press steam chamber for insertion of semi-product to a lower part of a mold as well as for removal of a finished tire from the mold.

2. Description of the Related Art

Lifting of an upper part of a steam chamber of a curing press is carried out in some prior art designs by means of a crank mechanism. The crank mechanism together with a roller fixed on an upper part of the steam chamber guided in fixed guideway connected with a frame performs both lifting of the upper part and moving of this part off of the chamber. A lower part of the steam chamber is then accessible to an operator and to a lifting device that allows insertion of a semi-product (green tire) as well as removal of the finished tire. This independent lifting device is placed on an operator side of the steam chamber, and so the finished tires handling is performed in a very close proximity to the operators. This is especially dangerous in the case of heaver tires.

In other known devices the upper part of the steam chamber is lifted by means of steam activated parallel columns. In this device the upper part of the steam chamber remains permanently above the lower part of the steam chamber. As in the previous solution, the lower part of the steam chamber doesn't change its position. In this design the curing press includes a lifting device that is designed to carry out tire handling between opened parts of the steam chamber, from the operators side of the steam chamber.

SUMMARY OF THE INVENTION

The present invention relates to a device for lifting an upper part of a curing press steam chamber. The upper part of the curing press steam chamber is provided, at least on one side, with at least a pair of rollers. Each of the rollers move along an independent guideway connected with a frame. Both guideways are mutually parallel and in a lower part perpendicular to a parting plane of the steam chamber. Between the frame and steam chamber upper part there is a linear motor whose axis forms an angle with each of the guideways which is less than a right angle. In this way the invention provides a solution for lifting of the upper part of the steam chamber to allow easier access to the open steam chamber. The invention allows access to the mold from a side of the ground plane of the lower part as well as vertical access to the upper part of the steam chamber, as well as other possibilities for removal of the finished tire from the mold.

The linear motor may be a suitable hydraulic cylinder or a motion screw with a stroke sufficient to induce adequate thrust.

For smaller steam chambers, it is advantageous to have at least a pair of rollers arranged in parallel on both sides. Preferably, the rollers are arranged between adjacent steam chambers which are connected by a transverse beam. In this way, the same rollers with respective guideways are used for both steam chambers and the overall lifting device is mechanically balanced.

BRIEF DESCRIPTION OF THE DRAWING FIGURES

DETAILED DESCRIPTION OF THE PREFERRED EMBODIMENTS

Figure 1:
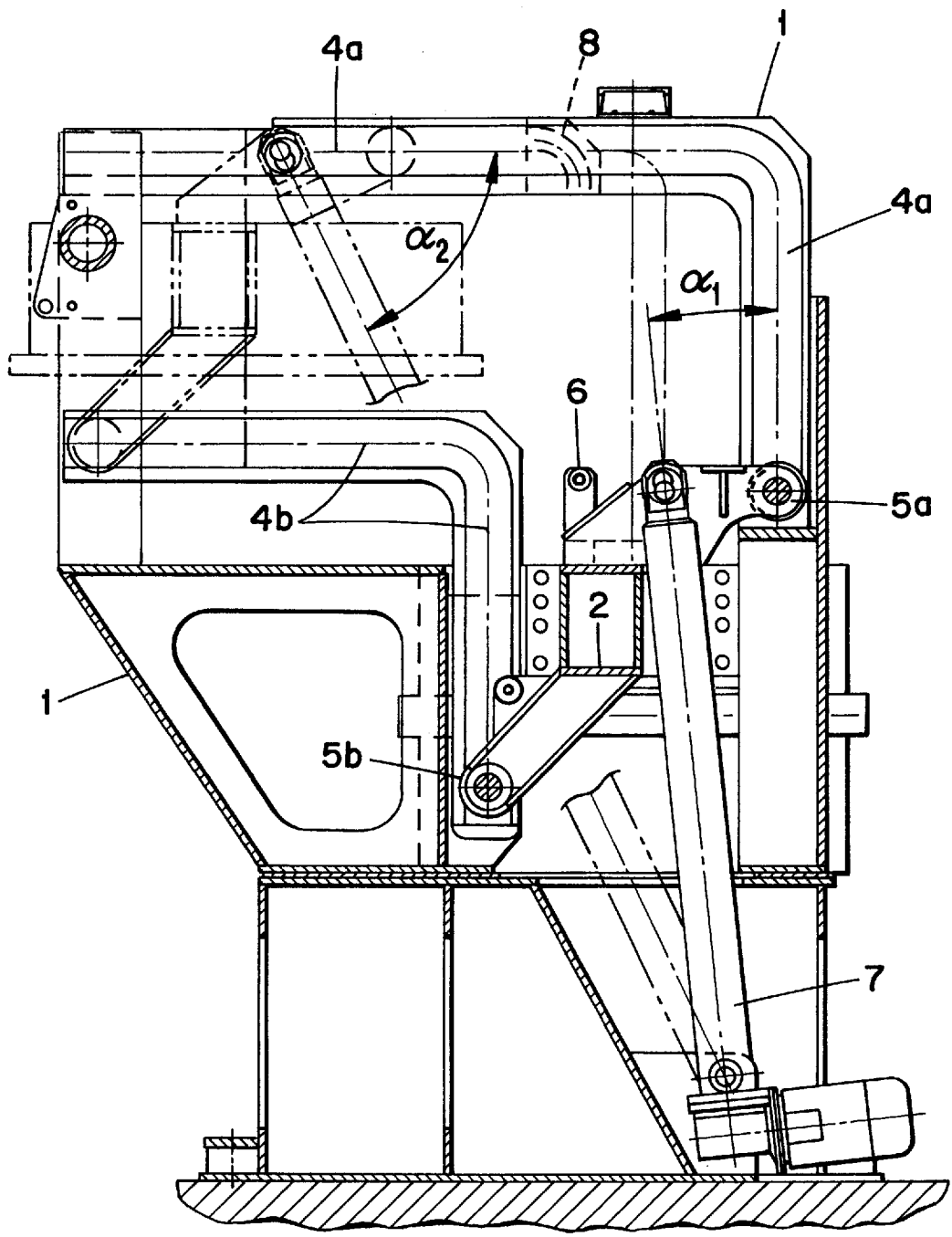
FIG. 1 is a side view of the device for lifting an upper part of a curing press steam chamber.
Figure 2:
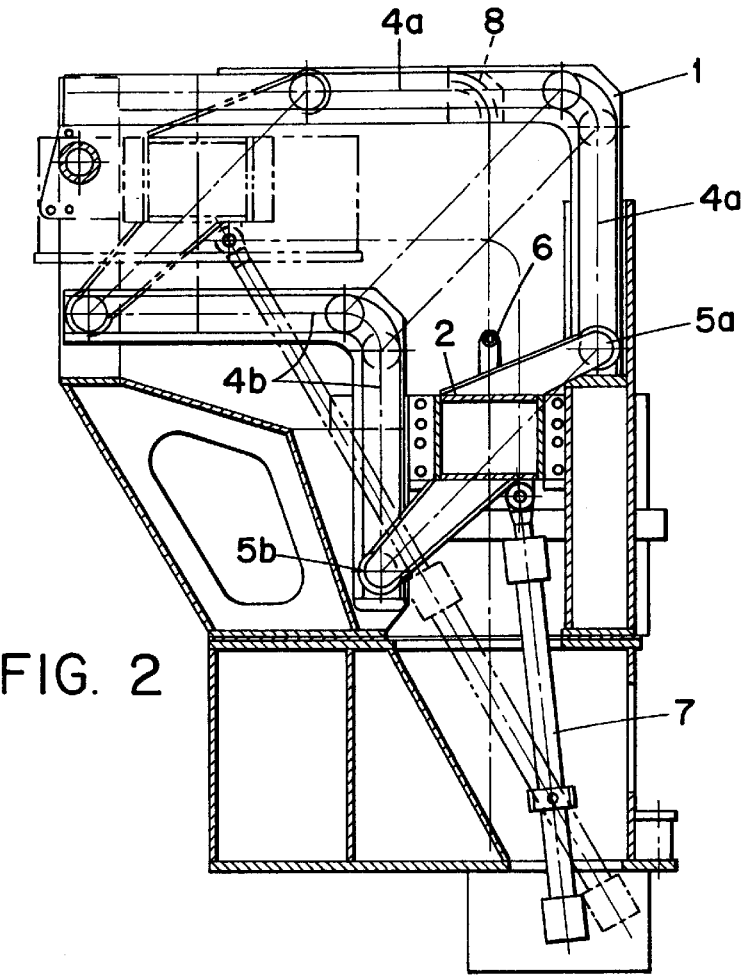
FIG. 2 is a side view of an alternative embodiment of the device for lifting an upper part of a curing press steam chamber.
Figure 3:
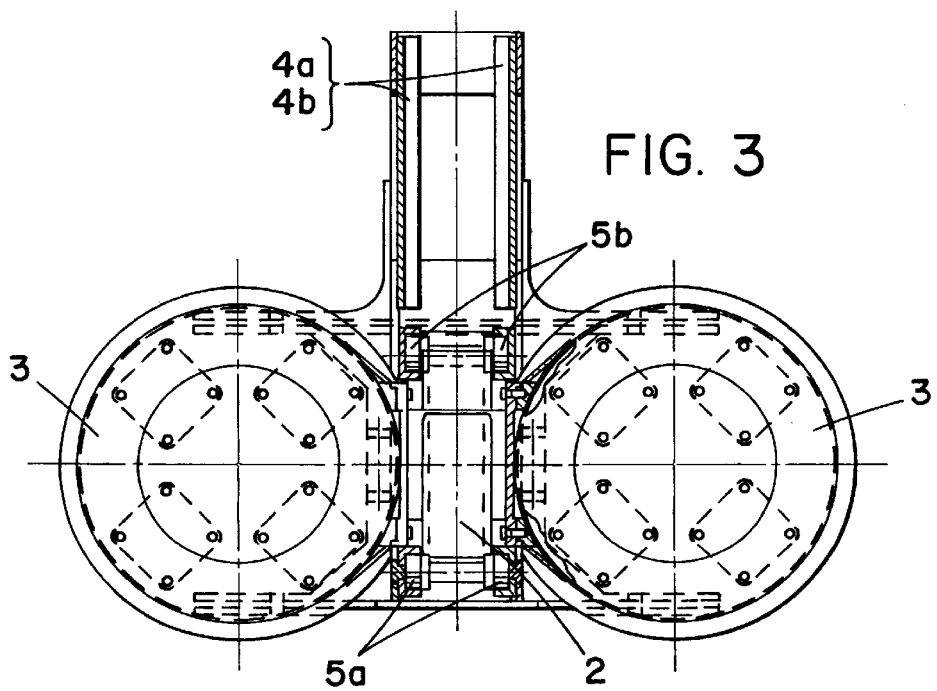
FIG. 3 is a top view of a pair of curing press steam chambers and the device for lifting an upper part of the steam chamber.

Upper parts of a pair of steam chambers 3, shown in FIG. 3, are connected together by means of a transverse beam 2. On the frame 1 there are a pair of mutually parallel guideways 4a, 4b. The guideways 4a, 4b are preferably substantially L-shaped. A lower part of each of the guideways 4a, 4b is perpendicular to a parting plane of the steam chambers 3. A pair of rollers 5a, 5b are rotatably mounted on the transverse beam 2. An upper roller 5a is received in an upper guideway 4a, and a lower roller 5b is received in a lower guideway 4b. In a lower part of the frame 1, there is a linear motor 7. In FIG. 1, the linear motor is formed by a motion screw. In FIG. 2, the linear motor 7 is formed by a hydraulic cylinder. The linear motor 7 forms an angle $\alpha$ with both guideways 4a, 4b which is smaller than a right angle. This arrangement of the linear motor 7 at the angle $\alpha$ with respect to the guideways 4a, 4b insures a smooth motion of the rollers 5a, 5b in the guideways 4a, 4b with a minimum intensity of undesirable forces perpendicular to the guideways 4a, 4b arising from a resolution of forces.

In the present invention where guideways 4a, 4b rapidly change a direction of their path, an unstable shift of the rollers 5a, 5b in the guideways 4a, 4b can occur during the direction change. Therefore it is preferable to complement the pair of rollers 5a, 5b and guideways 4a, 4b, at least in the transition section, with an auxiliary roller 6. The auxiliary roller is guided in the transition section by an auxiliary guideway 8 formed on the frame 1. The auxiliary guideway 8 is shown in hidden lines in the drawings.

The motion of linear motor 2, raises the upper parts of the steam chambers 3 along a path perpendicular to the parting planes of the steam chambers, as a result of the rollers 5a, 5b traveling in guideways 4a, 4b. The path of the guideways 4a, 4b perpendicular to the parting plane of the steam chambers 3 causes the upper section of the chamber to be lifted off the lower section. Due to the lifted upper part of the steam chambers 3, it is easier to remove the finished tire from the mold. When the rollers 5a, 5b reach the place where the guideways 4a, 4b change the direction, the auxiliary roller 6 runs along the indicated auxiliary guideway 8, and rollers 5a, 5b are kept smoothly on in guideways 4a, 4b.

In every position of the rollers 5a, 5b in the corresponding guideways 4a, 4b, the axis of the linear motor 7 forms angles $\alpha_1$ or $\alpha_2$ with the guideways 4a, 4b. The angles $\alpha_1$ and $\alpha_2$ are smaller than a right angle, which minimizes stress on the frame 1 and secures the smooth motion of lifted parts of the steam chambers 3.

The motion of the rollers 5a, 5b along the upper portions of the guideways 4a, 4b allows the upper parts of steam chambers 3, together with the finished tires, to move out from above the ground plane of the lower parts of the steam chambers 3. During this motion, the tires are held in the upper part of the mold by a device illustrated in FIG. 3. Once the upper parts of the steam chambers have moved out of the ground planes of the lower parts of the steam chambers 3, the finished tires will be able to be reached by the removing equipment. In addition, the lower parts of the molds are easily accessible for placement of a semi-product (green tire) of the new tires intended for processing. By return motion of the linear motor 7, the upper parts of the steam chambers 3, are replaced down onto the lower parts of steam chambers 3 by means of travel of rollers 5a, 5b along the guideways 4a, 4b, and the process is repeated.

What is claimed is:

1. An arrangement for lifting an upper part of a curing press steam chamber comprising:

at least one pair of rollers provided on an upper part of the steam chamber, each of which travels in an independent guideway connected with a frame, and wherein both guideways are mutually parallel, and in a lower part are perpendicular to a parting plane of the steam chamber; and a linear motor between the frame and said upper part of the steam chamber, the linear motor having an axis which extends with respect to each of said guideways at an angle smaller than a right angle.

2. The arrangement according to claim 1, wherein the linear motor comprises a hydraulic cylinder.

3. The arrangement according to claim 1, wherein the linear motor comprises a motion screw.

4. The arrangement according to claim 1, wherein the pair of rollers is used for lifting a pair of upper parts of adjacent steam chambers which are mutually connected by a transverse beam, on which the pair of rollers is arranged between the steam chambers.

5. The arrangement according to claim 1, wherein said independent guideways are substantially L-shaped having a first portion, a second portion, and a bend between the first portion and the second portion.

6. A device for lifting an upper part of a curing press steam chamber, the device comprising:

at least a pair of rollers mounted on an upper part of a steam chamber;

at least two guideways connected to a frame of the steam chamber, each of the guideways receiving at least one of the rollers;

a linear motor extending between the frame and the upper part of the steam chamber for lifting the upper part of the steam chamber off of a lower part of the steam chamber, the linear motor has a longitudinal axis of motion which is positioned at an angle of less than 90 degrees with respect to the guideways.

7. The device according to claim 6, wherein the linear motor comprises a hydraulic cylinder.

8. The device according to claim 6, wherein the linear motor comprises a motion screw.

9. The device according to claim 6, wherein each of the guideways forms a substantially L-shaped path along which the rollers travel.

10. The device according to claim 6, wherein the rollers are arranged on a transverse beam which connects the upper parts of two adjacent steam chambers.

11. The device according to claim 10, wherein the linear motor is pivotally connected to the transverse beam.

12. The device according to claim 6, wherein the guideways are arranged to allow the linear motor to first lift the upper part of the steam chamber in a direction perpendicular to a parting line of a mold positioned in the steam chamber and then move the upper part of the steam chamber substantially parallel to the parting line.

13. The device according to claim 6, further comprising an auxiliary roller which engages an auxiliary guideway to smoothly guide the lifting device during a transition when the rollers pass around a bend in the guideways.

* * * * *